United States Patent [19]

Thevenon

[11] Patent Number: 4,819,250
[45] Date of Patent: Apr. 4, 1989

[54] APPARATUS FOR MEASURING TEMPERATURE AT A HOT POINT ALONG AN ELECTRICAL ENERGY TRANSMISSION CABLE

[75] Inventor: Henri Thevenon, Lyons, France
[73] Assignee: Les Cables de Lyon, Clichy Cedex, France
[21] Appl. No.: 110,822
[22] Filed: Oct. 21, 1987
[30] Foreign Application Priority Data
  Oct. 24, 1986 [FR] France ................ 86 14796
[51] Int. Cl.$^4$ ............... G01K 5/20; H02G 1/00
[52] U.S. Cl. ................... 374/104; 174/11 R; 340/592; 374/202
[58] Field of Search ............. 374/110, 104, 101, 111, 374/202, 201, 57, 11 R, 152, 24; 174/11 R; 340/592

[56] References Cited

U.S. PATENT DOCUMENTS

| | | | |
|---|---|---|---|
| 2,686,215 | 8/1954 | Fondiller | 174/11 R X |
| 3,187,080 | 6/1965 | Ball | 174/11 R |
| 3,510,762 | 5/1970 | Leslie | 324/52 |
| 3,571,486 | 3/1971 | Kennedy | 174/11 R |
| 4,327,242 | 4/1982 | Saito | 174/11 R |

OTHER PUBLICATIONS

Electrical Review, vol. 199, No. 15, Oct. 15, 1976, p. 48.
IEEE Transactions on power apparatus and systems, vol. PAS-89, No. 7, Sep.–Oct. 1970, pp. 1429–1433, Kortschinski et al.

Primary Examiner—Daniel M. Yasich
Attorney, Agent, or Firm—Sughrue, Mion, Zinn, Macpeak & Seas

[57] ABSTRACT

Apparatus for measuring temperature at a hot point along an energy transmission cable (1) when the temperature exceeds a fixed limit temperature, the apparatus comprising a tube (3) containing a liquid which is vaporizable in the vicinity of said limit temperature and which is disposed in the energy transmission cable or in contact with its periphery, together with means for detecting an increase in the vapor pressure of said liquid at least one point along said tube, the apparatus being characterized in that said tube is connected at one of its ends to means for detecting an increase in the pressure exerted by the liquid at said end.

3 Claims, 2 Drawing Sheets

APPARATUS FOR MEASURING TEMPERATURE AT A HOT POINT ALONG AN ELECTRICAL ENERGY TRANSMISSION CABLE

FIELD OF THE INVENTION

The present invention relates to apparatus for measuring temperature at a hot point along an electrical energy transmission cable when the temperature exceeds a fixed limit temperature, the apparatus comprising a tube containing a liquid which is vaporizable in the vicinity of said limit temperature and which is disposed in the electrical energy transmission cable or in contact with its periphery, together with means for detecting an increase in the vapor pressure of said liquid.

BACKGROUND OF THE INVENTION

Proposals have already been made to perform such detection by means of thermocouples. However, hot zones in energy transmission cables are generally not more than a few meters long, which means that a very large number of thermocouples need to be distributed along the entire length of the cable.

Document U.S. Pat. No. 3,510,762 proposes disposing an auxiliary cable along an electrical energy cable with the auxiliary cable including a duct full of a liquid which is vaporizable in the vicinity of the maximum admissible temperature for the energy cable and whose vapor has a dielectric constant which is markedly different from that of the liquid, together with a high-frequency cable for detecting points at which the liquid is vaporized by reflectometry using electric pluses. However, such apparatus is too expensive for ordinary use, and it is only sensitive to the boiling temperature.

Also, document U.S. Paat. No. 3,187,080 proposes apparatus for detecting the temperature in different lengths of an electric cable which includes a tube filled with a liquid that is vaporizable in the vicinity of the maximum admissible temperature for the cable and in which each junction in the cable has a chamber connected to said tube, the chamber being partially filled with the same vaporizable liquid and being provided with a pressure-operated switch. The effect of partial vaporization of the liquid in the tube causes the liquid level to rise in the chamber and a float actuates the switch, thereby short-circuiting a pair of telephone wires incorporated in the cable and thus indicating which zone of the cable is being heated abnormally. Such apparatus cannot detect the zone where excessive heating is taking place with much precision, particularly since its indications are disturbed by temperature variations in the remainder of the cable outside the zone which is too hot. Further, the apparatus of the above document, like the previous apparatus, indicates that the vaporization temperature has been reached by detecting a variation in volume by virtue of the liquid vaporizing at constant pressure.

The object of the present invention is to provide apparatus for continuously measuring the temperature of a hot point on an electrical energy transmission cable with greater accuracy, and also providing indications which are more reliable than those of prior apparatuses.

SUMMARY OF THE INVENTION

The apparatus in accordance with the invention is characterized in that the tube containing a vaporizable liquid is connected at one of its ends to means for detecting an increase in the pressure exerted by the liquid at that end.

Preferably, the apparatus includes a second tube identical to the first and filled with the same liquid, said second tube being disposed in the proximity of the first tube and parallel thereto with the ends of both tubes being connected to cylinders fitted with moving pistons whose movements are rendered equal and opposite by a lever, with the end of the first tube being also connected to a pressure gauge and to a chamber of adjustable small volume, the piston connected to the end of the second tube is urged against the pressure exerted by the fluid contained in said tube by an actuator which sets up excess pressure such that said second tube contains liquid only, and the pressure difference between the first and second tubes is kept constant by a servo-mechanism. This increases sensitivity.

In this case, the apparatus advantageously includes at least one of the following characteristics:

it further includes means for measuring the angle of rotation of the piston-interconnecting lever about its own axis, which angle is a function of the average temperature in the first tube; and the chamber of adjustable small volume is delimited by a moving partition whose position is adjustable by a micrometer screw.

BRIEF DESCRIPTION OF THE DRAWINGS

The operating principle and the structure of apparatus in accordance with the invention are described below by way of example and with reference to the figures of the accompanying drawing, in which.

MORE DETAILED DESCRIPTION

Figure 1:
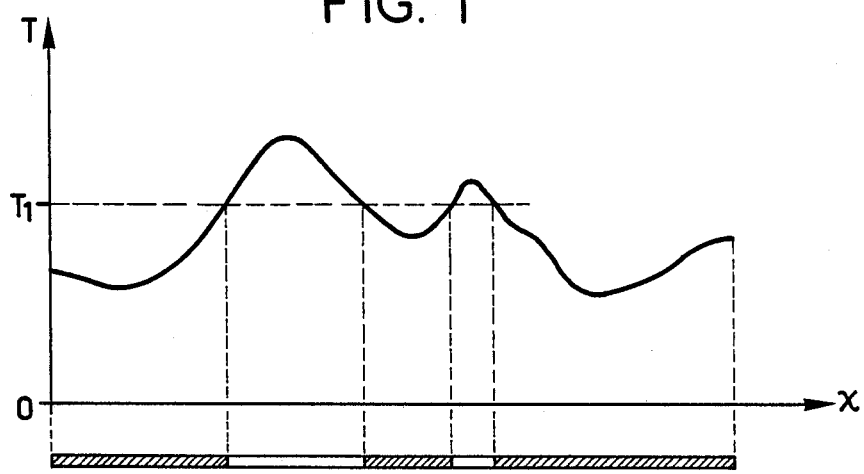
FIG. 1 shows the temperature reached by a vaporizable liquid along a length of cable.

FIG. 1 shows the variation in temperature T along the X axis in a monitoring tube disposed in an electrical cable and filled with a liquid that vaporizes at a temperature T1. Those lengths of the tube which are below the liquid vaporization temperature are shown shaded, and those lengths which are above the vaporization temperature are shown white. The pressure at the end of the tube is equal to the vapor temperature of the liquid at the interface between a liquid zone and a vapor zone.

However, detecting cable hot points solely by measuring the pressure at the end of the tube does not give good accuracy lengthwise.

Figure 2:
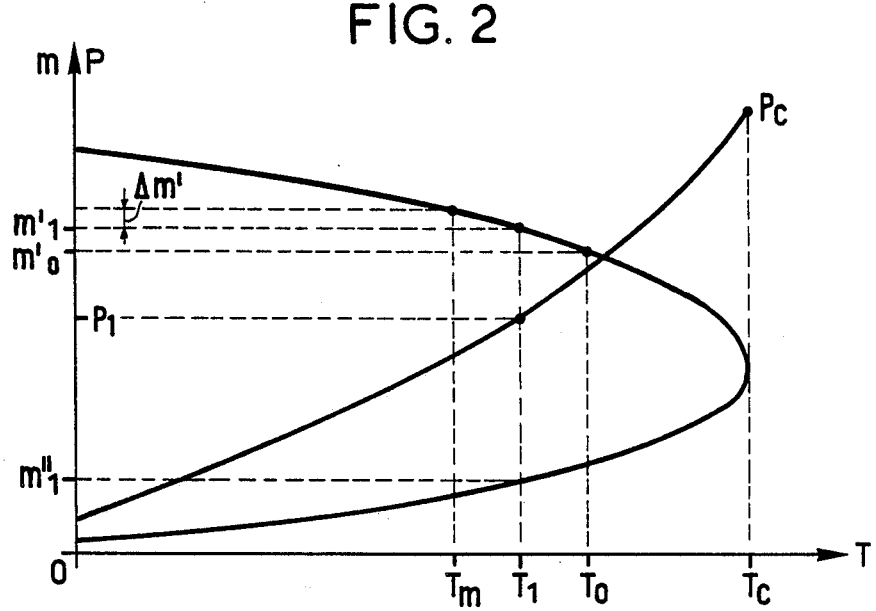
FIG. 2 shows graphs of the pressure and the specific density of the liquid and the vapor of such a liquid as a function of temperature.

Assume that the tube is initially filled with liquid at temperature T0 which is not greater than the maximum admissible temperature in the cable. With reference to FIG. 2, if a pressure gauge disposed at the end of the tube indicates a pressure P1 corresponding to a temperature T1, then the length x of the detected hot zone relative to the total length l of the tube is given by:

$$\frac{x}{l} = \frac{m'_1 + \Delta m' - m'_0}{m'_1 + \Delta m' - m''_1}$$

where m' and m'' designate the specific masses of the vapor phase and of the liquid phase respectively and $(m'_1 + \Delta m')$ designates the specific mass of the vapor at the average temperature Tm of the liquid, and Tc and Pc designate the critical temperature and pressure respectively.

It can be seen that the length of the hot gaseous zone reduces as the temperature T1 moves closer to T0.

The differential assembly described with reference to FIG. 3 serves to reduce the length of the detectable hot zone.

The electrical energy transmission cable 1 includes two tubes 3 and 4 close to its electrical conductor 2 and both filled with a liquid that vaporizes in the vicinity of the maximum admissible temperature for their locations in the cable, which temperature is often less than the temperature of the conductor per se, given the position of the tubes 3 and 4 within the electrical cable insulation. Carbon tetrachloride or monochlorethane may be used, for example, as the liquid. The tubes 3 and 4 are connected by ducts 5 and 6 to cylinders 7 and 8 slidably received in pistons 9 and 10. These pistons have their piston rods 11 and 12 connected via hinges 11A and 12A to a rocker lever 13 which is pivotally mounted about its middle axis 14. The end of the rod 12 of the piston 10 is also connected to the rod of an actuator 15 which exerts a pressure to bring the sum of the pressures exerted on the pistons 9 and 10 by the liquids in the tubes 3 and 4 into equilibrium, which pressure is great enough to ensure that the fluid contained in the tube remains totally in the liquid state.

The duct 5 is also connected to a pressure gauge 16 and to a small-volume chamber 17 whose volume is adjustable by means of a micrometer screw 18. Finally, the ducts 5 and 6 are connected to a servo-mechanism 19 which may be electrical, hydraulic, or pneumatic, and which serves to maintain the pressure difference between the ducts at a value of a few bars.

The apparatus operates as follows.

With the two tubes being equally filled with liquid that is vaporizable at the maximum admissible temperature, a bubble of vapor of given volume is created in communication with the measurement tube per se 3 by operating the micrometer screw 18. The actuator 15 exerts an equivalent pressure p equal to the sum of the pressures p1 exerted on the piston 9 and p2 exerted on the piston 10. Since the pressure exerted by the actuator 15 is constant, any increase in the pressure p1 gives rise to a decrease in the pressure p2, and vice versa. The servomechanism 19 maintains the difference p2−p1 at a constant value, thereby compensating for the effects of elasticity, in particular for compressibility of the liquids in the two tubes which would otherwise be added-in.

The pressure gauge 16 then indicates the vapor pressure of the hot point in the cable, with the relationship between vapor pressure and temperature in the fluid used being known.

Figure 3:
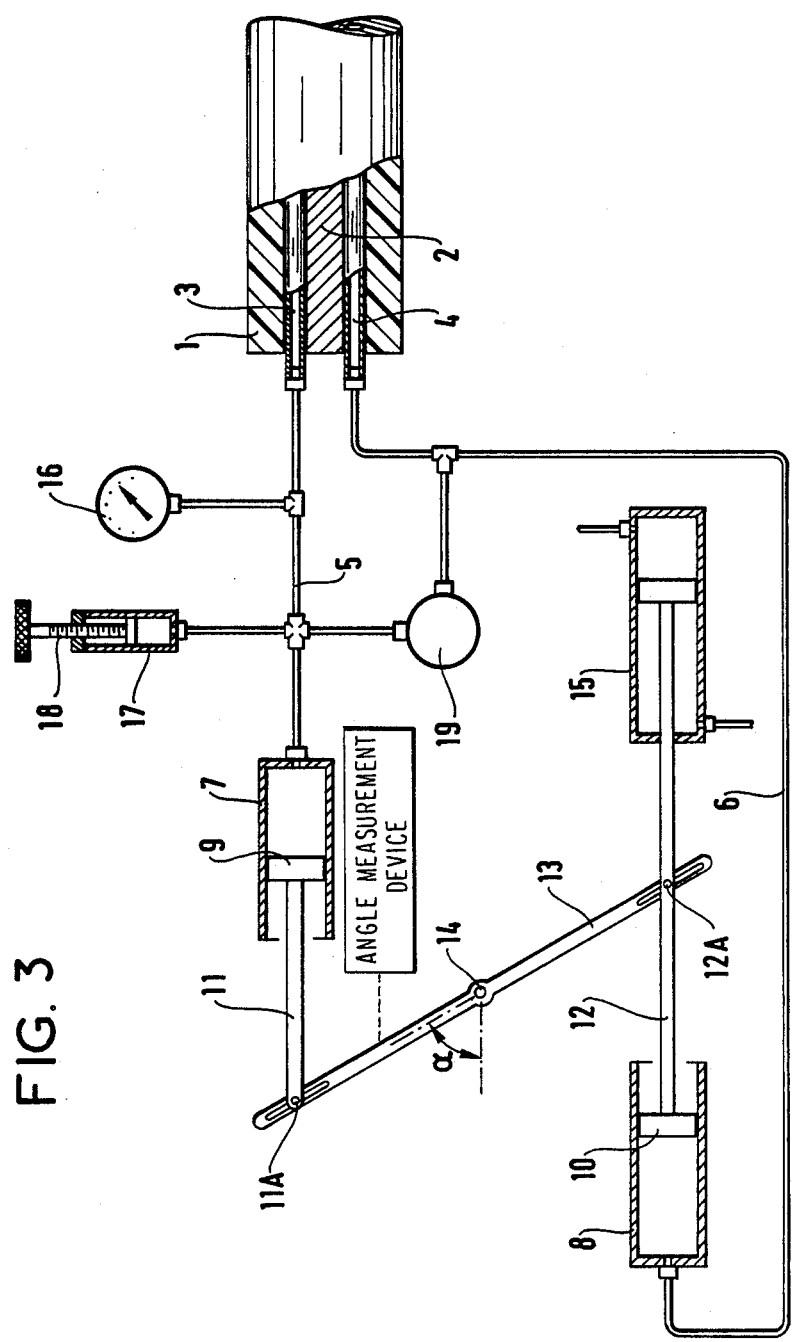
FIG. 3 shows apparatus in accordance with the invention.

Further, the angle of rotation $\alpha$ of the rocker lever interconnecting the ends of the piston is a function of the average temperature of the tube 3 and thus enables the average temperature to be determined and sensed by rotation angle measuring means, FIG. 3.

The tubes 3 and 4 performing the measurement are preferably disposed in the conductors. It is also possible, in order to facilitate their implantation, to place them in the packing of three-phase electrical cables, or else to place them simply in contact with the outside surface of the cable. In this case, the temperature of the conductor is determined by adding-in the temperature difference between the conductor and the zone of the cable in which the tubes are disposed, or else between the conductor and the surface of the cable, as given by a thermal image of the cable.

The measuring apparatus is put at one of the ends of the cable or at both ends. If sensitivity is to be increased, measuring apparatus may be disposed at each junction in the cable.

I claim:

1. An apparatus for measuring temperature at a hot point along an electrical energy transmission cable when the temperature exceeds a fixed limit temperature, said apparatus comprising a first tube containing a liquid which is vaporizable in the vicinity of said limit temperature to thereby increase a vapor pressure within said first tube, said first tube having a first tube end and said first tube being disposed in contact with the electrical energy transmission cable over the length of said cable;

pressure detecting means for detecting an increase in the vapor pressure of said liquid upon vaporizing thereof at at least one point along said tube, said pressure detecting means comprising means connected to said first tube end for detecting an increase in the pressure exerted by said liquid at said first tube end;

a second tube identical to the first tube and filled with the same liquid, said second tube being disposed in proximity to the first tube and parallel thereto;

said first tube having said end and said second tube having a second tube end connected respectively to cylinders fitted with moving pistons and a rocker lever, pivotally mounted at its center, and being connected at opposite ends to respective pistons whereby movement of the pistons are rendered equal and opposite by said pivotable rocker lever;

the end of the first tube being connected to a pressure gauge constituting said means for detecting an increase in pressure exerted by said liquid at said first tube end and to a chamber of adjustable small volume;

an actuator for exerting pressure on liquid contained in said second tube via the piston connected to the end of the second tube whereby excess pressure is set up therein such that said second tube contains liquid only; and a servo-mechanism for maintaining a pressure difference between the first and second tubes constant.

2. Apparatus according to claim 1, further including means for measuring the angle of rotation of the rocker lever interconnecting said pistons about the rocker lever pivot axis, with the rotation angle being a function of average temperature of said first tube.

3. Apparatus according to claim 2, wherein the chamber of adjustable small volume is delimited by a moving partition whose position is adjustable by a micrometer screw.

* * * * *